United States Patent [19]

Gunatillake et al.

[11] Patent Number: 5,403,912
[45] Date of Patent: Apr. 4, 1995

[54] PROCESS FOR THE PRODUCTION OF POLY(ALKYLENE OXIDE)

[75] Inventors: Pathiraja A. Gunatillake, Mulgrave; Gordon F. Meijs, Murrumbeena; Ezio Rizzardo, Wheelers Hill, all of Australia

[73] Assignees: Commonwealth Scientific and Industrial Research organization; Unisearch Limited, both of Australia

[21] Appl. No.: 66,072
[22] PCT Filed: Nov. 26, 1991
[86] PCT No.: PCT/AU91/00545
§ 371 Date: Jun. 21, 1993
§ 102(e) Date: Jun. 21, 1993
[87] PCT Pub. No.: WO92/09647
PCT Pub. Date: Jun. 11, 1992

[30] Foreign Application Priority Data

Nov. 27, 1990 [AU] Australia ............... PK3558

[51] Int. Cl.⁶ .................................. C08G 65/34
[52] U.S. Cl. .................................. 528/425
[58] Field of Search .......................... 528/425

[56] References Cited

U.S. PATENT DOCUMENTS

| | | | |
|---|---|---|---|
| 2,243,481 | 5/1941 | Meiler | 530/502 |
| 3,120,497 | 2/1964 | Bungs | 528/495 |
| 3,126,356 | 3/1964 | Kraft | 528/274 |
| 3,188,353 | 6/1965 | Holtschmidt | 568/619 |
| 4,661,411 | 4/1987 | Martin et al. | 428/421 |

FOREIGN PATENT DOCUMENTS

0415404A2 6/1991 European Pat. Off.

OTHER PUBLICATIONS

Exhibit A-Supplementary European Search Report.
Exhibit B-German 24 14 647-claims in English.
Abstract page of EP 0 235 998 A2 and A3.
Abstract page of EP 0 106 903.
PCT International Preliminary Examination Report.
PCT International search Report.

*Primary Examiner*—Morton Foelak
*Assistant Examiner*—Terressa Mosley
*Attorney, Agent, or Firm*—Merchant, Gould, Smith, Edell, Welter & Schmidt

[57] ABSTRACT

A process for the production of poly(alkylene oxide) which includes providing a polyhydroxy compound or compounds and an acid resin catalyst or a salt thereof that has been converted to the acid form; and reacting said polyhydroxy compound or compounds in the presence of said acid resin catalyst at a temperature and under conditions to allow polymerization.

12 Claims, No Drawings

PROCESS FOR THE PRODUCTION OF POLY(ALKYLENE OXIDE)

This invention relates to a process for the manufacture of poly(alkylene oxide) oligomers and co-oligomers, and low molecular weight polymers and copolymers. More specifically, the present invention relates to a process for the production of such compounds by intermolecular dehydration of polyhydroxy compounds in the presence of perfluorinated resin sulfonic acid catalysts.

The term poly(alkylene oxides) is used herein to refer to the reaction product produced by the process of the invention described. The scope of this term should be considered in light of the spirit of the following description and should not be considered limited to the specific examples.

Poly(alkylene oxides) are important precursors in the preparation of copolymers and segmented copolymers such as polyurethane and polyurethaneurea elastomers. These poly(alkylene oxides) when incorporated into polyurethanes form the "soft segment", and impart many useful properties to the polyurethane including elasticity, hydrolytic stability, thermal stability, and abrasion resistance. Common poly(alkylene oxides) that are produced for such purposes include poly(ethylene oxide), poly(propylene ozide) and poly(tetramethyleneoxide). These compounds may be prepared by the ring-opening polymerization of the corresponding cyclic ethers. This method is most suitable to polymerize cyclic ethers having 2-4 carbon and 1-3 oxygen atoms in the ring. Larger compounds however may also be used. For example, a cyclic ether having more than 4 carbon atoms and one hetero atom in a ring that undergoes ring opening polymerization is oxacycloheptane. German Patent Specification No. 1,125,386 describes a process to prepare poly(hexamethylene oxide) from oxacycloheptane using Friedel-Crafts catalysts or Lewis Acids.

German Patent Specification No. 1,156,709 describes a process for preparing poly(alkylene oxides) from alkanediols having 5-12 carbon atoms by heating to temperatures in the range from 200° to 400° C. in the presence of solid, non-basic catalysts such as oxides of aluminum, tungsten and chromium etc. One major disadvantage of this process is the need to use such high temperatures. The use of high temperatures may lead to the formation of undesirable side products and to discoloration of the product. Poly(alkylene oxides) having molecular weights of 450 to 1400 may be obtained by this process in yields ranging from 18-55%.

An article in Journal of the American Chemical Society, Vol. 72, pp 2216-2219 (1949) by P. J. Flory and M. J. Rhoad, describes a process to prepare poly(decamethylene oxide) by sulphuric acid catalysed polymerization of 1,10-decanediol at 200° C. However, purification of the product to remove the acid catalyst in this process is difficult. The acid catalyst is usually removed either by repeated recrystallization or by treatment with a base such as calcium hydroxide followed by washing the product with water. Often emulsions are formed during the washing step making isolation of the product extremely difficult. Incomplete removal of the acid catalyst can cause degradation of the poly(alkylene oxide). Furthermore, significant charring occurs especially when long reaction times are used.

It is an object of the present invention to overcome, or at least alleviate one or more of the difficulties associated with the prior art.

The present invention provides a process for the production of a poly(alkylene oxide) which includes, providing a polyhydroxy compound or compounds and an acid resin catalyst or a salt thereof that has been converted to the acid form; and reacting said polyhydroxy compound or compounds in the presence of said acid resin catalyst at a temperature and under conditions to allow polymerization. Preferably the catalyst is a sulfonic acid resin containing one or more halogen atoms. More preferably, the halogen atoms are fluorine. Most preferably, the sulfonic acid resin is a perfluorinated sulfonic acid resin.

A preferred catalyst used in the process of the invention is a polymer of an ethylenically unsaturated monomer containing groups such that the final polymer will contain groups of the formula

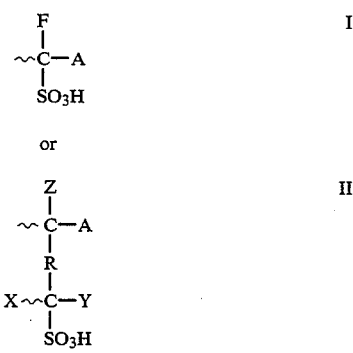

where
- ∿ represents the catalyst polymer chain or a segment thereof;
- A is hydrogen, an aliphatic or aromatic hydrocarbon radical of 1-10 carbon atoms, a halogen atom or a segment of the polymer chain;
- X and Y are hydrogen, halogen or an aliphatic or aromatic hydrocarbon radical of 1-10 carbon atoms, but at least one is fluorine;
- R is a linear or branched linking group having up to 40 carbon atoms in the principal chain; and
- Z is hydrogen, halogen or an aliphatic or aromatic hydrocarbon radical of 1-10 carbon atoms; or a copolymer of such a monomer with at least one other copolymerizable ethylenically unsaturated monomer.

The linking group defined by R in formula (II) can be a homogeneous one such as an alkylene radical, or it can be a heterogeneous one such as an alkylene ether radical. In the preferred catalysts, this linking radical contains 1-20 carbon atoms in the principal chain.

In particular, the most preferred sulfonic acid resins for use in the present invention are perfluorinated acid resins that consist of a backbone of fluoropolymer such as poly(tetrafluoroethylene) with pendant side chains of fluorinated or perfluorinated ethers such as vinyl ethers which terminate in a sulfonic acid group. It will be appreciated that other polymer chains such as bromo substituted chains or substituted propylene chains are contemplated for use in the present invention and the preferred examples referred to above are merely illustrative of the present invention. Most preferably, the pendant side chains are terminated with a sulfonic acid, but again, it should be appreciated that this is merely illustrative of a preferred embodiment of the invention.

Commercially available preferred examples of an acid resin are Nafion-H TM and its salts which are products of E. I. du Pont de Nemours Co., Inc. having the following general structure.

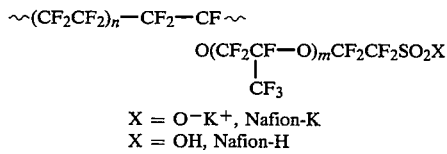

X = O⁻K⁺, Nafion-K
X = OH, Nafion-H

Generally the catalyst will be used in solid form, for example the Nafion resin may be used in both the powder or membrane form. The solid form of the catalyst allows for ease of removal through common liquid/solid separation techniques from the reaction mixture. Various salts of resins such as Nafion-K+ may also be used once converted to the acid form.

The amount of catalyst used in the reaction may range from 0.1% to 30% of the total weight of monomer present, preferably 2–10%.

Suitable polyhydroxy compounds that may be used in the process of the present invention include any polymerizable compound having an availability of at least two hydroxy groups. Such compounds include alkanediols preferably having from 2 to 20 carbon atoms in the main chain. The compounds may be branched or unbranched, cyclic or linear, substituted or unsubstituted or contain one or more hetero atoms in the main chain. Suitable substituents include any atom or side chain that does not substantially interfere with the polymerization process, such as substituted or unsubstituted aliphatic or aromatic hydrocarbons.

As an illustration, suitable polyhydroxy compounds include 1,6-hexanediol, 1,7-heptanediol, 1,8-octanediol, 1,9-nonanediol, 1,10-decanediol, 1,12-dodecanediol, glycerol, trimethylolpropane, 2-ethyl-2-(hydroxymethyl)-1,3-propanediol, pentaerythritol, 3,3,4,4,5,5-hexafluoro-1,5-pentanediol, 2,2,3,3,4,4,5,5-octafluoro-1,6-hexanediol and 3,3,4,4,5,5,6,6,7,7,8,8,9,9,10,10-hexadecafluoro-1,12-dodecanediol, 1,4-cyclohexanediol and 1,4-cyclohexanedimethanol.

The process according to the present invention may be used to produce poly(alkylene oxides) having a molecular weight of about 150 to 10,000 by the condensation polymerization of the polyhydroxy compound(s). The process is preferably carried out at a temperature above the melting point of the polyhydroxy compound(s) involved. More preferably the reaction temperature is from 130° C. to 220° C., most preferably about 170° C. It has been found that reaction at these temperatures is not sufficient to discolour the resultant reaction product significantly, or produce undesired by-products.

In a preferred embodiment of the invention, the process allows to a certain extent, control of the polymerization by removal of the catalyst when the desired level of polymerization has been reached. In this sense, the molecular weight of the resultant poly(alkylene oxide) may be controlled. An insoluble polymeric catalyst may be removed by conventional solid/liquid separation steps such as decantation, filtration and centrifugation. Such procedures yield a product that is substantially free of catalyst residue. An added benefit is that the catalyst may subsequently be regenerated and reused if desired.

By the combination of two or more polyhydroxy compounds, it is possible to obtain the corresponding poly(alkylene oxide) co-oligomer or copolymer. Polymerisation of diols or diol mixture will generally yield a linear bis-hydroxy terminated poly(alkylene oxide).

Branched chain poly(alkylene oxides) may be produced by incorporating a small amount, for example 1 to 10%, of a tri- or tetrahydroxy compound in the polymerization of a diol or mixture of diols.

By utilising the process according to the present invention, it is possible to produce a high yield product of high purity that has a reasonably narrow molecular weight distribution after removal of the water. By the incorporation of a small quantity of a monoalcohol in the reaction mixture, products that do not contain terminal functionality may be produced. The poly(alkylene oxides) of the present invention may be converted into hydrolysis and oxidation resistant polyurethanes. These polyurethanes may have various applications, for example biomedical use, or as a coating for fabric to make durable synthetic leather. The poly(alkylene oxides) per se may also have use as, or in surfactants.

The following examples are illustrative of processes according to the present invention, the scope of which, should not be considered to be limited thereto.

EXAMPLE 1

1,8-octanediol (100 g) was placed in a 500 ml round bottom flask and heated under vacuum (0.1 tort) at 100° C. for 1 hour. The flask was cooled to 50° C., and fitted with a nitrogen bleed, Dean-Stark trap and a condenser. Perfluorinated resin sulfonic acid resin (Nafion-H TM, 5.0 g) was added, and the reaction mixture was heated at 170° C. under a controlled flow (100 ml/min) of dry nitrogen with stirring. The side arm of the Dean-Stark trap was kept insulated with cotton wool during the reaction. The reaction was monitored by analysing samples at different time intervals by size exclusion chromatography (SEC), and continued until the desired molecular weight was obtained. Polymers with different molecular weights were obtained by varying the interval of the heating process as shown by the results in Table 1. In another experiment, after 9 hours of reaction, the Nafion catalyst was removed by decanting off the molten polymerized reaction mixture. The product was further purified by recrystallization from absolute ethanol. The solid product isolated by filtration was dried in a vacuum oven at 45° C. for 48 h to give 70 g of pure product. The molecular weight of the purified product, poly(octamethylene oxide), was determined by SEC, vapour pressure osmometry (VPO) and proton nuclear magnetic resonance spectroscopy ($^1$H-NMR).

The $^1$H-NHR signals at 3.63 (triplet, OCH$_2$ end group), 3.36 (triplet, OCH$_2$ of repeat unit), 1.57 (multiplet, —OCH$_2$CH$_2$), 1.31 [multiplet, —(CH$_2$)$_4$—] and 2.0 PPM (OH end group) established the structure of the polymer as HO(CH$_2$CH$_2$CH$_2$CH$_2$CH$_2$CH$_2$CH$_2$CH$_2$O)-7—H.

EXAMPLES 2–3

The procedure described in Example 1 was followed, except that 1,10-decanediol (100 g) and 1,6-hexanediol (100 g) were used for Examples 2 and 3, respectively. The molecular weight results at different time intervals are given in Table 1. The molecular weights of the purified products, poly(decamethylene oxide) and poly(hexamethylene oxide), obtained after 9 and 23 hours, respectively, are given in Table 2.

TABLE 1

Nafion ™ Catalysed Polymerization of Alkylenediols

| reaction time at 170° C., hours | MW by SEC[a] $M_n$ | $M_w/M_n$ | conversion (%)[b] |
|---|---|---|---|
| *1,8-octanediol (Example 1)* | | | |
| 3 | 420 | 1.07 | 40 |
| 6 | 470 | 1.15 | 70 |
| 9 | 800 | 1.43 | 93 |
| 23 | 2040 | 1.67 | 100 |
| *1,10-decanediol (Example 2)* | | | |
| 3 | 720 | 1.16 | 55 |
| 6 | 1720 | 1.42 | 100 |
| 9 | 2200 | 1.60 | 100 |
| *1,6-hexanediol (Example 3)* | | | |
| 3 | 320 | 1.09 | 39 |
| 6 | 480 | 1.18 | 85 |
| 23 | 1730 | 2.92 | 100 |
| *1,8-octanediol (Example 4)* | | | |
| 4.5[c] | 750 | 1.62 | — |
| 6[d] | 2370 | 1.57 | 100 |

[a]molecular weight relative to polystyrene standards
[b]estimated from SEC peak areas
[c]3 hours under nitrogen flow and 1.5 hours under vacuum (0.1 torr).
[d]3 hours under nitrogen flow and 3 hours under vacuum (0.1 torr).

EXAMPLE 4

1,8-octanediol (100 g) was placed in a 500 ml round bottom flask and heated under vacuum (0.1 torr) at 100° C. for 1 hour. The flask was cooled to 50° C., and fitted with a nitrogen bleed, Dean-Stark trap and a condenser. Perfluorinated resin sulfonic acid (Nafion-H, 5.0 g) was added, and the reaction mixture was heated at 170° C. under a controlled flow (100 ml/min) of dry nitrogen with stirring. The side arm of the Dean-Stark trap was insulated with cotton wool during the reaction. After three hours the flask was connected to a vacuum pump and heating at 170° C. was continued for a further 3 hours (0.1 torr). The results are given in Table 1. The product obtained after 9 hours of reaction was purified using the procedure in Example 1, and the results are shown in Table 2.

EXAMPLES 5-6

The procedure described in Example i was followed, except that the reactions were carried out at 150° C. and 190° C., respectively, for Examples 5 and 6. In Example 5, the molecular weight of the purified polymer obtained after 23 hours reaction time was 5020 (dispersity=1.53) as determined by SEC. In Example 6, a product with a molecular weight of 1220 (dispersity=1.34) was obtained after one hour of reaction time.

EXAMPLE 7

The procedure in Example 1 was followed, except that 100 g of an equimolar mixture of 1,6-hexanediol (40.4 g) and 1,10-decanediol (59.6 g) was used in place of 1,8-octanediol. After the reaction catalyst was removed by filtration to yield 87 g of copolymer. The copolymer was further purified by recrystallization from a 50/50 mixture of ethanol and water to yield 65 g of pure product. The number average molecular weight of the copolymer was 1280 (poly-dispersity=1.13) as determined by SEC.

TABLE 2

Molecular Weights of Purified Poly(alkylene oxides) Determined by Various Methods

| | | | molecular weight | | | |
|---|---|---|---|---|---|---|
| | | | SEC[a] | | yield[b] | |
| Example | VPO | $^1$H-NMR | $M_n$ | $M_w/M_n$ | (%) | functionality[c] |
| 1 | 860 | 850 | 1550 | 1.20 | 77 | 2.0 |
| 2 | 745 | 755 | 1450 | 1.23 | 76 | 2.0 |
| 3 | 2390 | — | 4680 | 1.25 | 30 | — |
| 4 | 1580 | 1600 | 3090 | 1.25 | 75 | 2.0 |

[a]SEC calibration was relative to polystyrene standards
[b]% of theoretical yield as purified product
[c]number of hydroxyl groups/molecule calculated from VPO and NMR results

EXAMPLE 8

The procedure in Example 1 was followed, except that 73 g of 1,7-heptanediol and 3.7 g of Nafion-H were used in place of the reactants in Example 1. The reaction was carried out for 12 h at 170° C., and Nafion-H was removed by decanting off the molten polymerized reaction mixture to yield 53 g of polymer. The number average molecular weight of the polymer was 820, as estimated by areas of $^1$H-NMR signals at 3.62 (triplet, end group $OCH_2$), and 3.37 PPM (triplet, repeat unit $OCH_2$).

EXAMPLE 9

In this example an equimolar mixture of two diols was used to prepare a copolymer. 1,10-Decanediol (13.9 g, 0.080 mol), 1,3-propanediol (6.08 g, 0.080 mol), and Nafion-H (1.0 g) were placed in a 50 ml round bottom flask fitted with a nitrogen bleed, Dean-Stark trap and a condenser. The mixture was heated at 170° C. under a controlled flow (100 ml/min) of dry nitrogen with stirring. The side arm of the Dean-Stark trap was kept insulated with cotton wool during the reaction. After nine hours of reaction, the Nafion-H catalyst was removed by decanting off the molten polymerized reaction mixture. The product was further purified by dissolving it in hot isopropanol to make a 10% (w/v) solution and precipitating into cold distilled water (2 L). The polymer isolated by filtration was dried in a vacuum oven at 45° C. for 48 h to yield 13.5 g of product. The number average molecular weight and polydispersity of the purified polymer was 2050 and 1.45, respectively, as determined by SEC. The molecular weight estimated from $^1$H-NMR signal areas was 930. $^1$H-NMR spectroscopy also verified that the product contained units derived from both 1,10-decanediol and 1,3-propanediol in 1:1 ratio. The $^1$H-NMR spectrum of the polymer showed signals at 3.77 (triplet, $OCH_2$ end group from propanediol), 3.63 (triplet, $OCH_2$ end group from decanediol), 3.48 (multiplet, $OCH_2$ of propylene oxide), 3.37 (triplet, $OCH_2$ of decamethylene oxide repeat unit), 1.83 (multiplet, —$CH_2$— of propylene oxide), 1.56 (multiplet, —$OCH_2CH_2$ of decamethylene oxide), 1.28 (broad singlet, —$(CH_2)_6$ of decamethylene oxide) and 1.56 PPM (singlet, OH end group).

EXAMPLE 10

In this example a cycloalkane diol was copolymerized with 1,10-decanediol. The procedure described in Example 9 was followed, except that the reaction was carried out in a 100 ml flask using a mixture of 1,10-decanediol (37.5 g, 0.216 mol), 1,4-cyclohexanediol (12.5 g, 0.108 mol) and Nafion-H (2.5 g) in place of the reactants used in Example 9. The reaction was carried out for 12 h at 170° C., and Nafion-H catalyst was removed by decanting off the molten polymerized reaction mixture. The product was further purified by dissolving it in hot absolute ethanol to make a 10% (w/v) solution and precipitating into cold distilled water (2 L). The polymer isolated by filtration was dried in a vacuum oven at 45° C. for 48h to yield 33 g of pure product. The purified product showed a number average molecular weight of 900 and polydispersity of 1.28, as determined by SEC.

EXAMPLE 11

The procedure described in Example 9 was followed, except that the reaction was carried out in a 100 ml flask using a mixture of 1,10-decanediol (DD, 30.8 g, 0.177 mol), 1,4-cyclohexanedimethanol (CHDM, 19.2 g, 0.133 mol) and Nafion-H (2.5 g) in place of the reactants used in Example 9. The reaction was carried out for 14 h at 170° C., and Nafion-H catalyst was removed by decanting off the molten polymerized reaction mixture yielding 36 g of polymer. The number average molecular weight and polydispersity of the unpurified polymer were 750 and 1.22 respectively, as determined by SEC. $^1$H-NMR spectroscopy provided evidence for the presence of repeat units derived from both DD and CHDM in the copolymer. The $^1$H-NMR spectrum of the product showed signals at 3.62 (triplet, OCH$_2$ end group of DD), 3.37 (triplet, OCH$_2$ of DD repeat unit), 1.53 (multiplet, ring CH$_2$ of CHDM and —OCH$_2$CH$_2$ of DD repeat units), 1.27 (broad singlet, —(CH$_2$)$_6$ of DD), 0.94 (multiplet, ring CH$_2$ of CHDM), 1.82 (multiplet, ring CH of CHDM), 3.20 (doublet, OCH$_2$ of CHDM repeat unit) and 3.45 PPM (triplet, OCH$_2$ end group of CHDM).

What is claimed is:

1. A process for the production of a poly(alkylene oxide), comprising:
polymerizing a polyhydroxy compound or compounds in the presence of a perfluorinated resin sulfonic acid, said resin being selected from the group consisting of:
a resin derived from an ethylenically unsaturated monomer and a resin derived from an ethylenically unsaturated monomer with at least one different copolymerizable ethylenically unsaturated monomer, wherein the monomers contain groups such that the final polymer will contain groups of the formula:

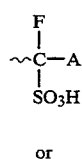

I or

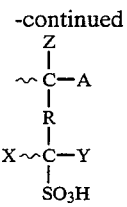

II where ⁓⁓represents the acid resin chain or a segment thereof;
A is hydrogen, an aliphatic or aromatic hydrocarbon radical of 1–10 carbon atoms, a halogen atom or a segment of the polymer chain;
X and Y are hydrogen, halogen or an aliphatic or aromatic hydrocarbon radical of 1–10 carbon atoms, but at least one is fluorine;
R is a linear or branched linking group having up to 40 carbon atoms in the principal chain; and
Z is hydrogen, halogen or an aliphatic or aromatic hydrocarbon radical of 1–10 carbon atoms;
wherein the resin is present in an amount of from 0.1 to 30% of the total weight of the polyhydroxy compound or compounds present, and the reaction takes place at a temperature of from 130°–220°.

2. A process according to claim 1 wherein the linking radical contains 1 to 20 carbon atoms in the principal chain.

3. A process according to claim 1 wherein the catalyst is a perfluorinated resin sulfonic acid consisting of a backbone of fluoro polymer.

4. A process according to claim 1 wherein the catalyst is Nafion-H ™.

5. A process according to claim 1 wherein the catalyst is used in a range of from 2 to 10% of the total weight of the monomer present.

6. A process according to claim 1 wherein the polyhydroxy compound is selected from any compound having an availability of at least 2 hydroxy groups.

7. A process according to claim 6 wherein the polyhydroxy compound is selected from 1,6-hexanediol, 1,7-heptanediol, 1,8-octanediol, 1,9-nonanediol, 1,10-decanediol, 1,12-dodecanediol, glycerol, trimethylolpropane, 2-ethyl-2-(hydroxymethyl)1,3-propanediol, pentaerythritol, 3,3,4,4,5,5-hexafluoro-1,5-pentanediol, 2,2,3,3,4,4,5,5-octafluoro-1,6-hexanediol and 3,3,4,4,5,5,6,6,7,7,8,8,9,9,10,10-hexadecafluoro-1,12-dodecanediol, 1,4-cyclohexanediol and 1,4-cyclohexanedimethanol.

8. A process according to claim 1 wherein a combination of two or more polyhydroxy compounds are used to produce a poly(alkylene oxide) co-oligomer or co-polymer.

9. A process according to claim 1 wherein the extent of polymerization is controlled by removal of the catalyst by conventional solid/liquid separation steps at a predetermined point.

10. A process according to claim 1 wherein the reaction temperature is approximately 170° C.

11. A poly(alkylene oxide) compound produced by the process according to claim 1.

12. A process, according to claim 1, substantially as hereinbefore described with reference to any one of the examples.

* * * * *

UNITED STATES PATENT AND TRADEMARK OFFICE
CERTIFICATE OF CORRECTION

PATENT NO. :  5,403,912

DATED :  April 4, 1995

INVENTOR(S) :  Pathiraja A. Gunatillake; Gordon F. Meijs; Ezio Rizzardo

It is certified that error appears in the above-identified patent and that said Letters Patent is hereby corrected as shown below:

Section (73), Assignees, delete "organization" and insert therefor --Organization--.

Column 4, line 32, delete "tort" and insert therefor --torr--.

Column 5, line 48, delete "i" and insert therefor --(1)--.

Signed and Sealed this

Twelfth Day of September, 1995

Attest:

BRUCE LEHMAN

Attesting Officer     Commissioner of Patents and Trademarks